United States Patent
Naaman et al.

(10) Patent No.: US 11,868,204 B1
(45) Date of Patent: *Jan. 9, 2024

(54) CACHE MEMORY ERROR ANALYSIS AND MANAGEMENT THEREOF

(71) Applicant: Amazon Technologies, Inc., Seattle, WA (US)

(72) Inventors: Ofer Naaman, Hod Hasharon (IL); Osnat Katz, Alone Aba (IL); Nir Bar-Or, Hadera (IL); Adi Habusha, Alonei Abba (IL)

(73) Assignee: Amazon Technologies, Inc., Seattle, WA (US)

( * ) Notice: Subject to any disclaimer, the term of this patent is extended or adjusted under 35 U.S.C. 154(b) by 20 days.

This patent is subject to a terminal disclaimer.

(21) Appl. No.: 17/548,270

(22) Filed: Dec. 10, 2021

(51) Int. Cl.
*G06F 11/00* (2006.01)
*G06F 11/07* (2006.01)

(52) U.S. Cl.
CPC .......... *G06F 11/079* (2013.01); *G06F 11/073* (2013.01); *G06F 11/0751* (2013.01)

(58) Field of Classification Search
None
See application file for complete search history.

(56) References Cited

U.S. PATENT DOCUMENTS

| | | | | |
|---|---|---|---|---|
| 8,291,259 B2 * | 10/2012 | Guthrie | ................. | G06F 11/073 714/48 |
| 2008/0294847 A1 * | 11/2008 | Maruyama | ............ | G06F 12/126 711/E12.098 |
| 2009/0292857 A1 * | 11/2009 | Tanabe | ................. | G06F 12/0891 711/3 |
| 2012/0144253 A1 * | 6/2012 | Comparan | .......... | G06F 11/0772 714/704 |
| 2013/0246868 A1 * | 9/2013 | Takagi | ................. | G06F 11/0763 714/719 |
| 2014/0344641 A1 * | 11/2014 | Jeong | .................... | G06F 11/073 714/759 |
| 2015/0347254 A1 * | 12/2015 | Jones | .................. | G06F 11/0751 714/6.13 |

OTHER PUBLICATIONS

Google Scholar/Patents search—text refined (Year: 2023).*

* cited by examiner

*Primary Examiner* — Christopher S Mccarthy
(74) *Attorney, Agent, or Firm* — Klarquist Sparkman, LLP

(57) ABSTRACT

A system includes an obsolete cache-line vector having a plurality of memory elements, wherein each memory element has a one-to-one correspondence to a cache line entry of a cache memory. The vector can capture cache line errors that occur at different times from an error detection logic associated with the cache memory. A counter can be coupled to the obsolete cache-line vector for tracking how many of the memory elements in the vector are activated. When a predetermined threshold is reached, a threshold comparator can release a trigger for further analysis. An error events logger can be used to track all of the errors that occurred. The error events logger can also use a time stamp, which can assist the RAS system in analyzing a correlation between the errors, such as patterns that occur and time differences between the errors.

19 Claims, 6 Drawing Sheets

CACHE MEMORY ERROR ANALYSIS AND MANAGEMENT THEREOF

BACKGROUND

In recent years, processors in server computers are becoming denser with an increased core count that contain hundreds of megabytes of on-die caches. With increased cache density, the probability for errors for cache memory increases. For this reason, modern caches integrate error detection and correction hardware to alleviate some of the errors. In advanced machines that implement a RAS (Reliability Availability and Serviceability) mechanism, information about the error is recorded to help in failure analysis. Such information often includes the exact cache line instance, index, and other identifying information. However, RAS management firmware is interrupt driven and is triggered to run whenever a first error occurs. Consequently, the RAS data structures are designed to record only the first error and information about other errors is not tracked. As a result, a burst of errors having correlation between the errors would be impossible to analyze given the current RAS solutions.

DETAILED DESCRIPTION

When cache line errors occur in previous systems, error detection logic would set a pulse to trigger an alert. However, the previous systems have no ability to capture multiple errors and determine patterns associated with the errors. Accordingly, a system is described that includes an obsolete cache-line vector having a plurality of memory elements, wherein each memory element has a one-to-one correspondence to a cache line entry of a cache memory. The memory elements together form the obsolete cache-line vector. The obsolete cache-line vector can capture cache line errors that occur at different times as signaled from an error detection logic associated with the cache memory. Once an error is captured, the memory element in the vector is activated and remains activated until the entire vector is reset. A counter can be coupled to the obsolete cache-line vector for tracking how many of the memory elements in the obsolete cache-line vector are activated. When a predetermined threshold is reached, a threshold comparator can release a trigger, which can signal a RAS system to analyze the cache memory to determine why the errors occurred. An error events logger can be used to track all of the errors that occurred, rather than just the first error. The error events logger can also use a time stamp, which can assist the RAS system in analyzing a correlation between the errors, such as patterns that occur and time differences between the errors. Being able to analyze the nature of run-time errors (exact location, repeating errors, same or multiple indexes, correlation between indexes, etc.) allows improved in-field hardware testing for screening unhealthy chips and servers to reduce the number of error events.

Figure 1:
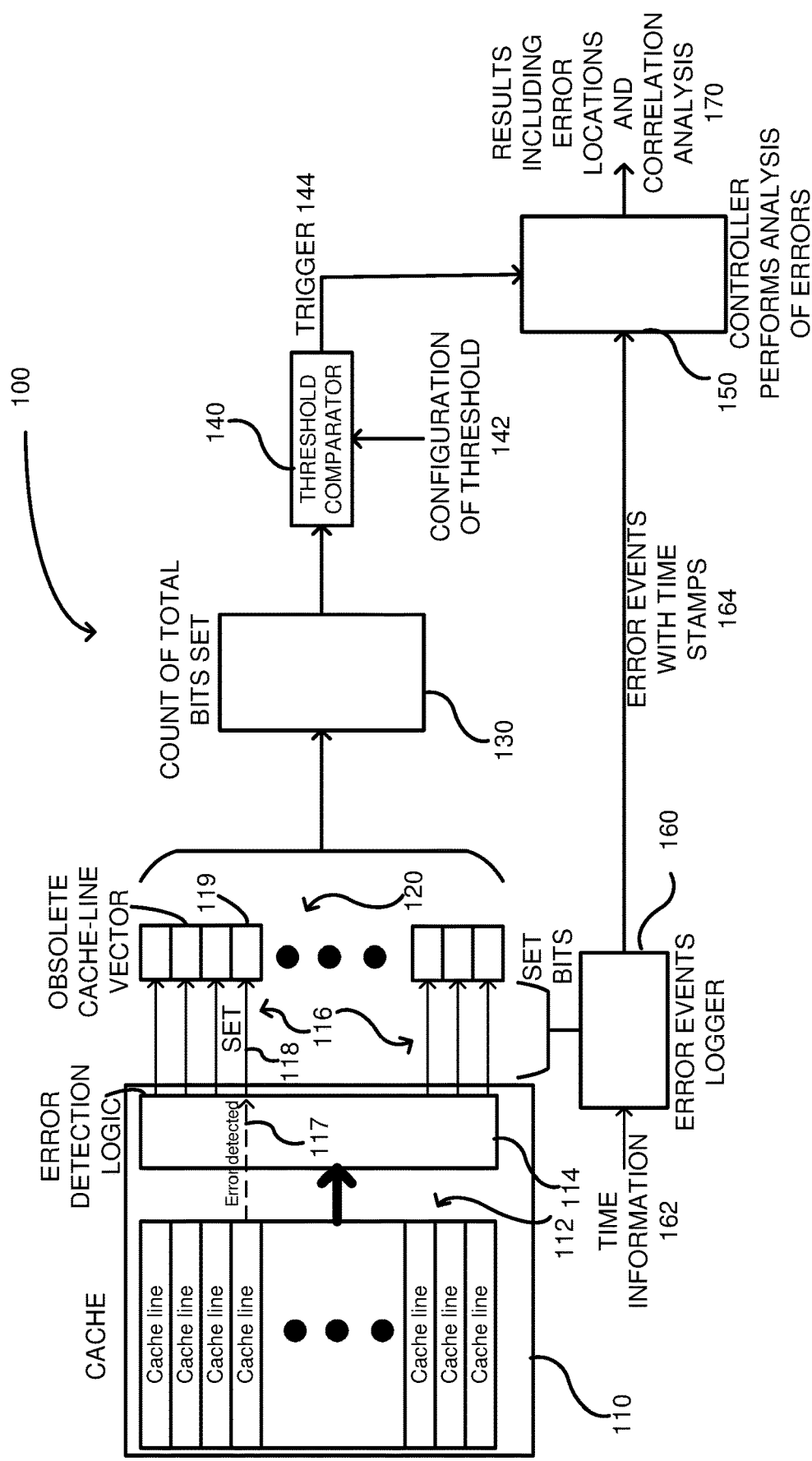
FIG. 1 is a system for cache memory error detection according to one embodiment including an obsolete cache-line vector.

FIG. 1 is a system diagram of a system 100 for detecting cache memory errors. The system 100 includes a cache memory 110 including a plurality of cache memory lines, shown generally at 112. The cache memory 110 also includes error detection logic 114. The error detection logic 114 outputs a plurality of error signal lines 116, wherein each error signal line corresponds to one cache line 112. When an error is detected on a cache line 112, the corresponding output on the error signal lines 116 is activated as a transitory pulse. As further described below, an obsolete cache line vector 120 includes a plurality of memory elements and captures the transitory pulse of the error signal lines 116. In particular, the plurality of memory elements are coupled in parallel to the error detection logic 114. In one example, an error is shown as detected at 117 resulting in one of the error signal lines 116 being set at 118. A corresponding memory element 119 of the obsolete cache line vector is then set, capturing the cache line error. When set, the memory element 119 stores activation data, which can be a single bit or other desired length of data, indicating that the error detection logic 114 has detected an error condition. Once set, the corresponding memory element 119 of the cache line vector 120 remains set or locked until the entire cache line vector is reset despite that the output 118 (a transitory signal) on the error signal lines 116 returns to its original state (i.e., not set). If the same transitory signal 118 on the error signal lines 116 is set again upon detecting another cache line error, the corresponding memory element of the cache line vector 120 is not impacted if it is already set. Accordingly, multiple errors for the same cache line 112 are not counted more than once. A counter 130 is coupled to each of the memory elements of the obsolete cache line vector 120 and computes the total number of memory elements that are set (i.e., have captured an error). Thus, the counter 130 counts how many of cache lines 112 have had at least one error. A threshold comparator 140 is coupled to the counter 130 and receives a configuration input 142, which adjusts when the threshold comparator is triggered. When the counter 130 reaches the predetermined threshold, as set by the configuration 142, then the threshold comparator 140 outputs a trigger signal 144. The trigger signal 144 can, in turn, be received by a controller 150, which can perform analysis on the errors in the cache 110. An error events logger 160 receives the error signal lines 116 and time information 162 and outputs error events 164 with associated time stamps. Thus, each time one of the error signal lines outputs an error signal, it is captured by the error events logger 160. The events logger 160 can also store an identifier of the cache line that failed and a time of when it failed. The controller 150 uses the error events 164 to perform analysis on the errors in the cache memory 110. The controller 150 can output results 170 that include the error locations of the cache memory 110 together with any correlation analysis. The correlation analysis can relate to a location of cache memory lines for which errors are detected or timing of when the errors occurred. Generally, repeating patterns can be identified based on location and/or timing and used to troubleshoot potential problems with the cache memory.

Figure 2:
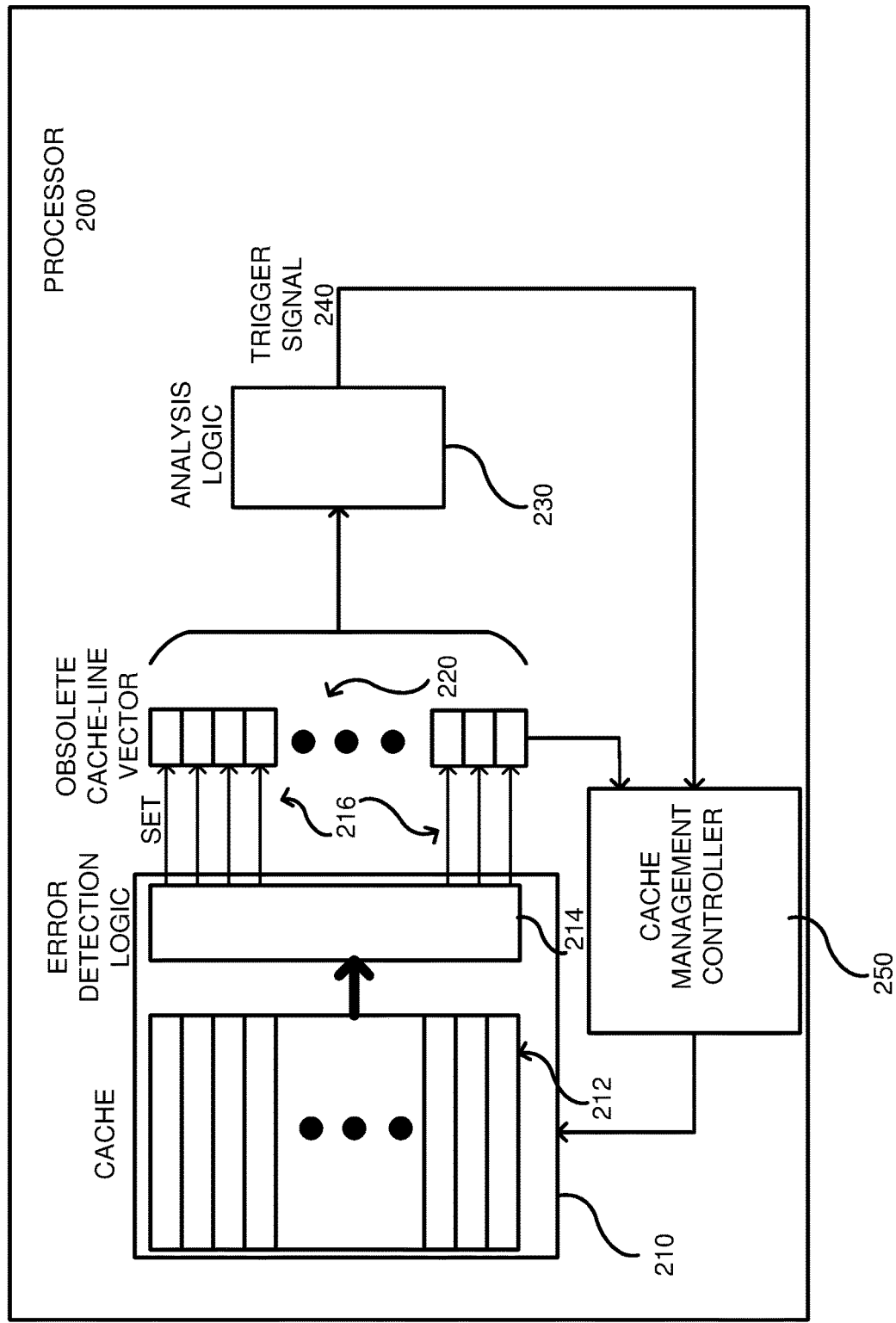
FIG. 2 is a system for cache memory error detection according to another embodiment including the obsolete cache-line vector.

FIG. 2 shows another embodiment including a processor 200 including a cache memory 210 having a plurality of cache lines 212 and error detection logic 214 similar to that described in relation to FIG. 1. Additionally, the error detection logic 214 has output lines 216 that can be set when an error occurs in a cache line. The number of output lines 216 can equal the number of cache lines 212 so that any error on a cache line can trigger one of the corresponding output lines 216 to be set. An obsolete cache line vector 220 can be coupled to the output lines 216 of the error detection logic 214. The obsolete cache line vector 220 can have a plurality of memory elements wherein each memory element corresponds to each output line 216. Whenever one of the output lines 216 are set, even for a transitory period, the corresponding memory element of the obsolete cache line vector 220 can capture that the output line was set. Analysis logic 230 can be coupled to the obsolete cache line vector 220. The analysis logic 230 can determine correlations between the errors and can generate a trigger signal 240 if it is determined that corrective action should be taken. The trigger signal 240 can be received by a cache management controller 250, which can take corrective action on the cache memory 210, such as by ensuring some of the problematic cache lines are no longer used. The cache management controller 250 can be coupled to the obsolete cache-line vector 220 for determining which cache line or cache lines are problematic. Although the embodiment relates to a processor 200, the components can be included in a different type of integrated circuit.

Figure 3:
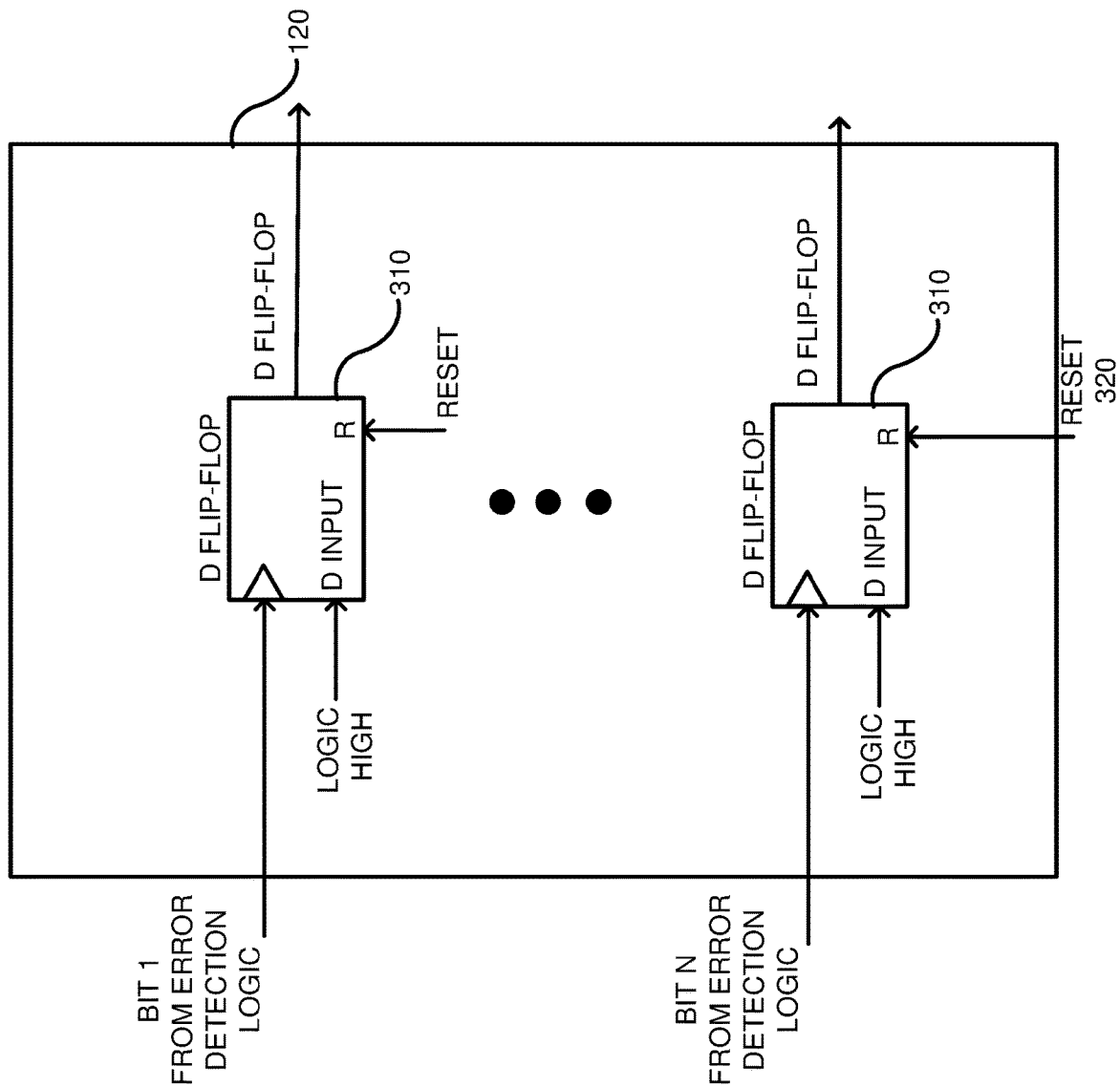
FIG. 3 shows a detailed view of the obsolete cache-line vector of FIGS. 1 and 2.

FIG. 3 shows further details of the obsolete cache line vector 120. In this embodiment, the obsolete cache line vector 120 can include N flip-flops 310, where N equals any integer value and corresponds to a number of outputs of the error detection logic 114 (FIG. 1). The flip-flops 310 are shown as D-type flip-flops with a logic high coupled to the D input and the inputs from the error detection logic 114 coupled to a clock input. When any one of the input bits from the error detection logic transitions from a low to a high logic value, the D flip-flop latches the D input, which captures a logic high. Thus, a transition on the input line is captured by the corresponding D flip-flop. A reset line 320 can be used to reset all of the flip-flops in the obsolete cache line vector 120. Although D flip-flops are shown, there are a variety of circuits that can be used for the obsolete cache line vector, and any such circuits can be substituted for the implementation of FIG. 3.

Figure 4:
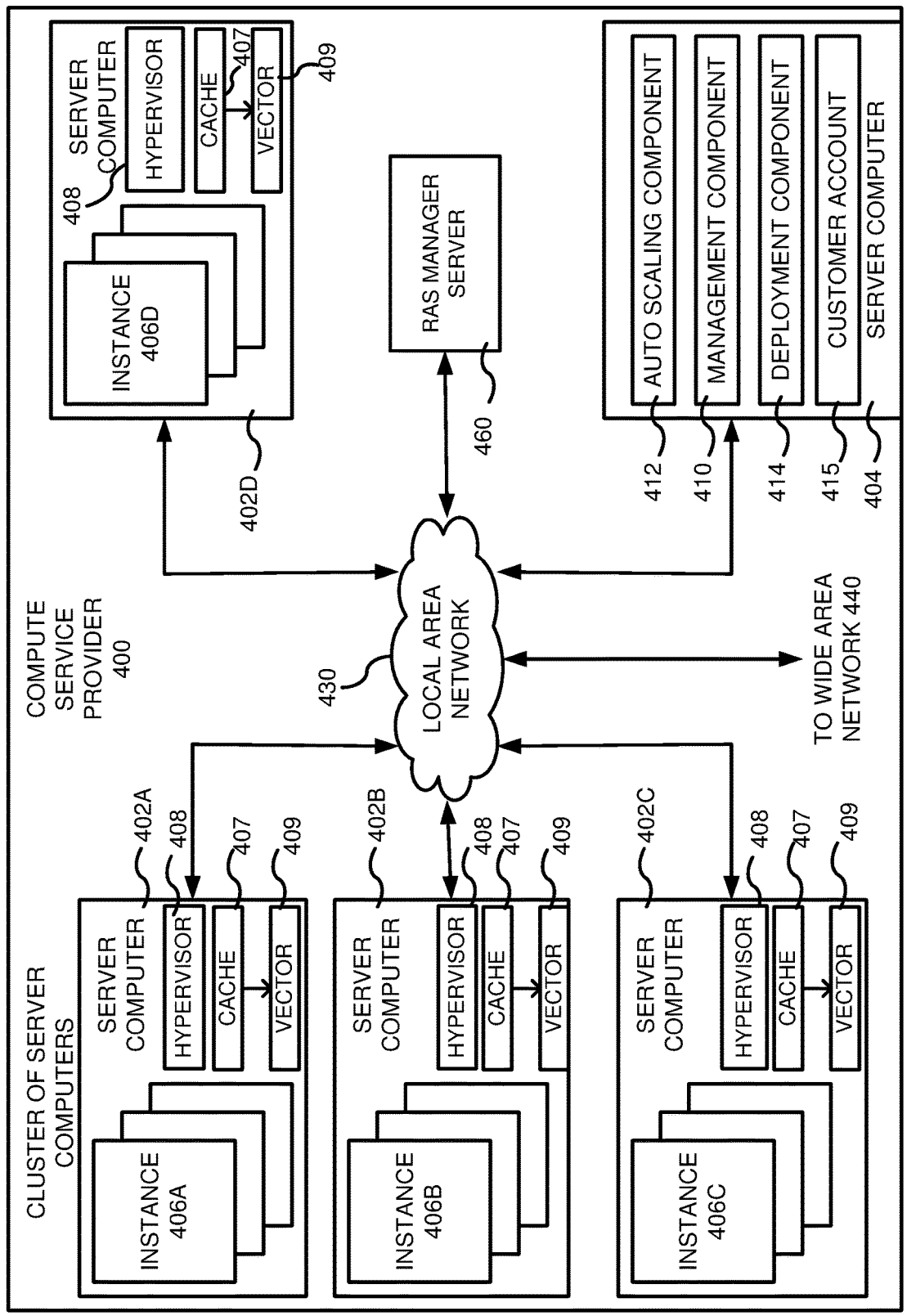
FIG. 4 shows a compute service provider environment for executing a RAS management server for analyzing correlation between errors captured by the obsolete cache-line vectors of FIGS. 1 and 2.

FIG. 4 is a computing system diagram of a network-based compute service provider 400 that illustrates one environment in which embodiments described herein can be used. By way of background, the compute service provider 400 (i.e., the cloud provider) is capable of delivery of computing and storage capacity as a service to a community of end recipients. In an example embodiment, the compute service provider can be established for an organization by or on behalf of the organization. That is, the compute service provider 400 may offer a "private cloud environment." In another embodiment, the compute service provider 400 supports a multi-tenant environment, wherein a plurality of customers operate independently (i.e., a public cloud environment). Generally speaking, the compute service provider 400 can provide the following models: Infrastructure as a Service ("IaaS"), Platform as a Service ("PaaS"), and/or Software as a Service ("SaaS"). Other models can be provided. For the IaaS model, the compute service provider 400 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 400 using networked client devices, such as desktop computers, laptops, tablets, smartphones, etc. running web browsers or other lightweight client applications. Those skilled in the art will recognize that the compute service provider 400 can be described as a "cloud" environment.

In some implementations of the disclosed technology, the computer service provider 400 can be a cloud provider network. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

With cloud computing, instead of buying, owning, and maintaining their own data centers and servers, organizations can acquire technology such as compute power, storage, databases, and other services on an as-needed basis. The cloud provider network can provide on-demand, scalable computing platforms to users through a network, for example allowing users to have at their disposal scalable "virtual computing devices" via their use of the compute servers and block store servers. These virtual computing devices have attributes of a personal computing device including hardware (various types of processors, local memory, random access memory ("RAM"), hard-disk and/or solid state drive ("SSD") storage), a choice of operating systems, networking capabilities, and pre-loaded application software. Each virtual computing device may also virtualize its console input and output ("I/O") (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users can choose to deploy their virtual computing systems to provide network-based services for their own use and/or for use by their customers or clients.

A cloud provider network can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs are the primary backbone locations linking customers to the cloud provider network, and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

The cloud provider network may implement various computing resources or services that implement the disclosed techniques for TLS session management, which may include an elastic compute cloud service (referred to in various implementations as an elastic compute service, a virtual machines service, a computing cloud service, a compute engine, or a cloud compute service), data processing service (s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users of the cloud provider network, which may be provisioned in user accounts.

The particular illustrated compute service provider 400 includes a plurality of server computers 402A-402D. While only four server computers are shown, any number can be used, and large centers can include thousands of server computers. The server computers 402A-402D can provide computing resources for executing software instances 406A-406D. In one embodiment, the instances 406A-406D are virtual machines. As known in the art, a virtual machine is an instance of a software implementation of a machine (i.e. a computer) that executes applications like a physical machine. In the example of virtual machine, each of the servers 402A-402D can be configured to execute a hypervisor 408 or another type of program configured to enable the execution of multiple instances 406 on a single server. Additionally, each of the instances 406 can be configured to execute one or more applications. Each of the server computers 402A-402D can include a cache 407 and an obsolete cache-line vector 409, similar to those described above.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 404 can be reserved for executing software components for managing the operation of the server computers 402 and the instances 406. For example, the server computer 404 can execute a management component 410. A customer can access the management component 410 to configure various aspects of the operation of the instances 406 purchased by the customer. For example, the customer can purchase, rent or lease instances and make changes to the configuration of the instances. The customer can also specify settings regarding how the purchased instances are to be scaled in response to demand. The management component can further include a policy document to implement customer policies. An auto scaling component 412 can scale the instances 406 based upon rules defined by the customer. In one embodiment, the auto scaling component 412 allows a customer to specify scale-up rules for use in determining when new instances should be instantiated and scale-down rules for use in determining when existing instances should be terminated. The auto scaling component 412 can consist of a number of subcomponents executing on different server computers 402 or other computing devices. The auto scaling component 412 can monitor available computing resources over an internal management network and modify resources available based on need.

A deployment component 414 can be used to assist customers in the deployment of new instances 406 of computing resources. The deployment component can have access to account information associated with the instances, such as who is the owner of the account, credit card information, country of the owner, etc. The deployment component 414 can receive a configuration from a customer that includes data describing how new instances 406 should be configured. For example, the configuration can specify one or more applications to be installed in new instances 406, provide scripts and/or other types of code to be executed for configuring new instances 406, provide cache logic specifying how an application cache should be prepared, and other types of information. The deployment component 414 can utilize the customer-provided configuration and cache logic to configure, prime, and launch new instances 406. The configuration, cache logic, and other information may be specified by a customer using the management component 410 or by providing this information directly to the deployment component 414. The instance manager can be considered part of the deployment component.

Customer account information 415 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, etc.

A network 430 can be utilized to interconnect the server computers 402A-402D and the server computer 404. The network 430 can be a local area network (LAN) and can be connected to a Wide Area Network (WAN) 440 so that end users can access the compute service provider 400. It should be appreciated that the network topology illustrated in FIG. 4 has been simplified and that many more networks and networking devices can be utilized to interconnect the various computing systems disclosed herein.

A RAS manager server computer 460 is coupled to the network 430 and can receive results from individual server computers relating to error location of errors in cache memory 407 on any of the servers 402A-402D, which can be obtained by the obsolete cache-line vector 409. The RAS manager server 460 can then perform correlation analysis based on the timing and location of the errors. By receiving results from multiple different server computers, the RAS manager server computer 460 can perform a global analysis of cache performance in the compute service provider environment 400. Additionally, the RAS manager server 460 can perform a reset of any of the obsolete cache-line vectors, such as by activating the reset line 320 (FIG. 3).

Figure 5:
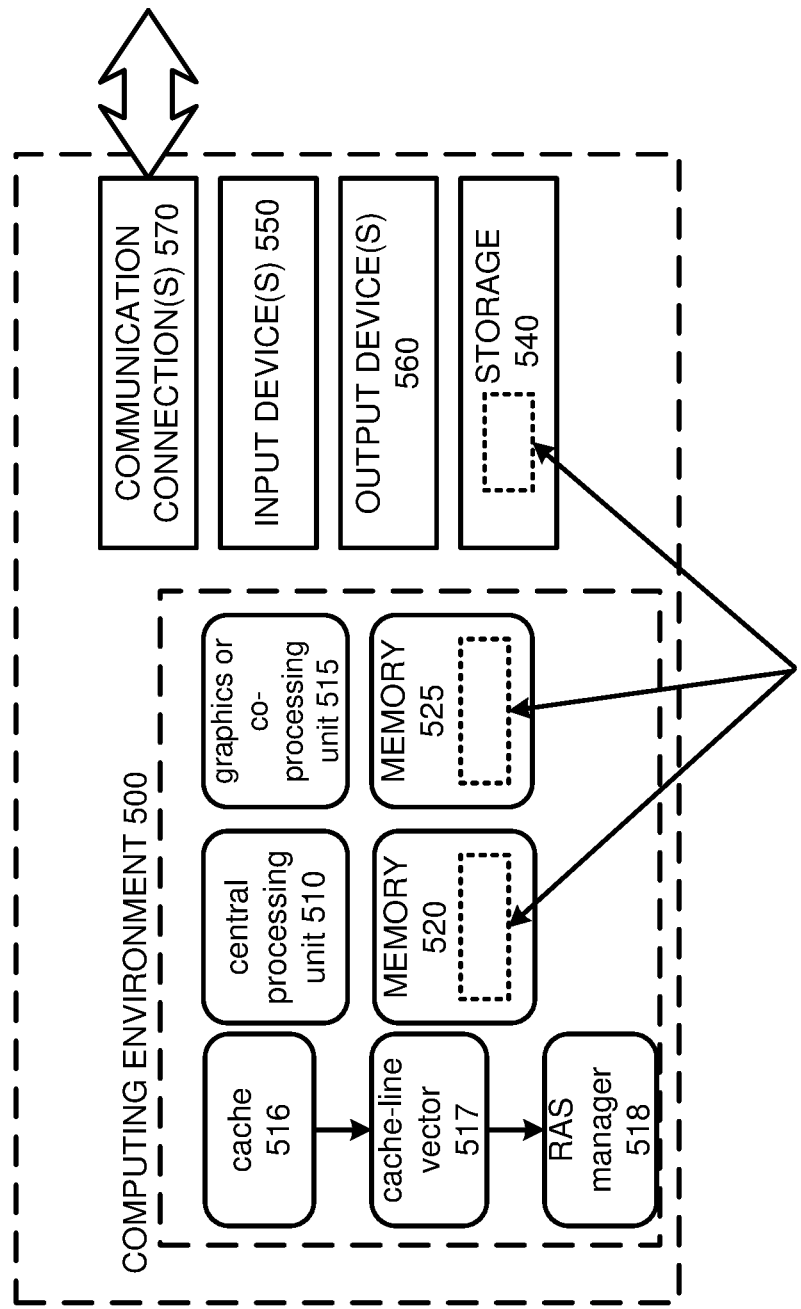
FIG. 5 depicts a generalized example of a suitable computing environment in which the described innovations may be implemented.

FIG. 5 depicts a generalized example of a suitable computing environment 500 in which the described innovations may be implemented. The computing environment 500 is not intended to suggest any limitation as to scope of use or functionality, as the innovations may be implemented in diverse general-purpose or special-purpose computing systems. For example, the computing environment 500 can be any of a variety of computing devices (e.g., desktop computer, laptop computer, server computer, tablet computer, etc.).

With reference to FIG. 5, the computing environment 500 includes one or more processing units 510, 515 and memory 520, 525. In FIG. 5, this basic configuration 530 is included within a dashed line. The processing units 510, 515 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 5 shows a central processing unit 510 as well as a graphics processing unit or co-processing unit 515. A cache memory 516 can be separate from the central processing unit 510 (as shown) or integrated therein. Coupled to the cache memory 516 is a cache-line vector 517, which can capture cache line errors in a similar manner as described above in relation to the obsolete cache-line vector 120 of FIG. 1. A RAS manager 518 can receive an output of the cache-line vector 517 and can analyze results of failing cache lines, such as a correlation between different cache lines that failed. The tangible memory 520, 525 may be volatile memory (e.g., registers, cache, RAM), non-volatile memory (e.g., ROM, EEPROM, flash memory, etc.), or some combination of the two, accessible by the processing unit(s). The memory 520, 525 stores software 580 implementing one or more innovations described herein, in the form of computer-executable instructions suitable for execution by the processing unit(s).

A computing system may have additional features. For example, the computing environment 500 includes storage 540, one or more input devices 550, one or more output devices 560, and one or more communication connections 570. An interconnection mechanism (not shown) such as a bus, controller, or network interconnects the components of the computing environment 500. Typically, operating system software (not shown) provides an operating environment for other software executing in the computing environment 500, and coordinates activities of the components of the computing environment 500.

The tangible storage 540 may be removable or non-removable, and includes magnetic disks, magnetic tapes or cassettes, CD-ROMs, DVDs, or any other medium which can be used to store information in a non-transitory way and which can be accessed within the computing environment 500. The storage 540 stores instructions for the software 580 implementing one or more innovations described herein.

The input device(s) 550 may be a touch input device such as a keyboard, mouse, pen, or trackball, a voice input device, a scanning device, or another device that provides input to the computing environment 500. The output device(s) 560 may be a display, printer, speaker, CD-writer, or another device that provides output from the computing environment 500.

The communication connection(s) 570 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, aspects of the disclosed technology can be implemented by software written in C++, Java, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Figure 6:
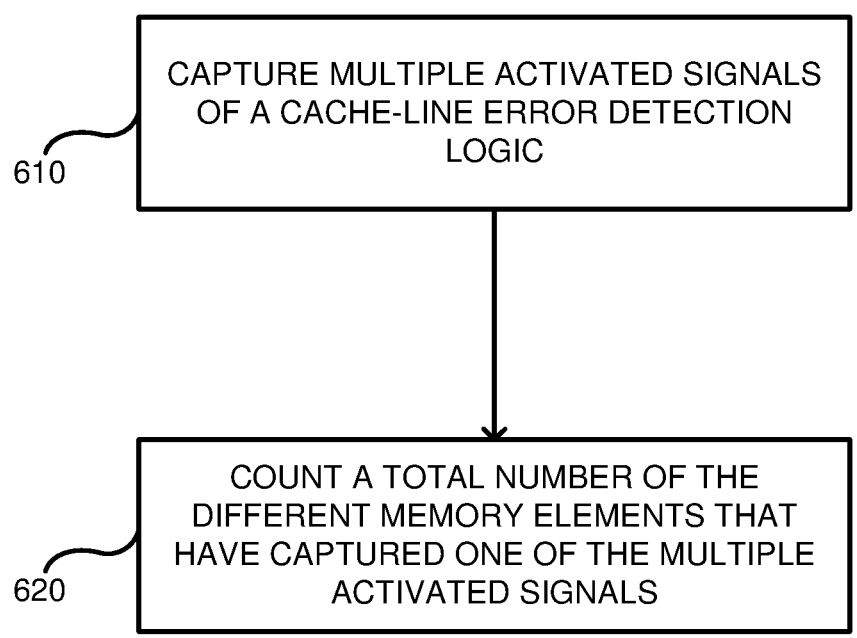
FIG. 6 is a flowchart of a method for implementing cache memory error detection.

FIG. 6 is a flowchart of a method for detecting cache line errors in a cache memory. In process block 610, multiple activated signals of a cache-line error detection logic are captured. For example, in FIG. 1, the error detection logic 114 activates (i.e., active high or low) any of the signal lines 116 that correspond to a cache line where an error has been detected. The cache-line vector 120 can then capture a pulse that occurs on the signal lines 116 by setting a memory element (e.g., a flip-flop) coupled to the signal lines 116. In process block 620, a count is made of the total number of the different memory elements that have captured an activated signal line. For example, in FIG. 1, each memory element in the obsolete cache-line vector 120 that has captured an activated signal line 116 can be included in a total count by the counter 130. Thus, for example, if 10 cache line errors occur on 10 different cache lines, then the counter 130 will have a count of 10. Duplicate cache line errors are not re-counted due to the structure of the memory elements. For example, in FIG. 3, once a flip-flop receives an activated bit, the flip-flop locks in the logic high value until reset.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A system of error detection in an integrated circuit, the system comprising:
    a cache memory including a plurality of cache memory lines;
    error detection logic coupled to the cache memory, the error detection logic including a plurality of outputs, wherein each of the plurality of outputs has a one-to-one correspondence with the plurality of cache memory lines such that one of the plurality of outputs is configured to be activated when an error is detected on a corresponding cache memory line;
    a cache line vector coupled to the plurality of outputs of the error detection logic, the cache line vector including a plurality of memory elements for storing activation data indicating which of the plurality of outputs from the error detection logic has been activated, wherein each of the plurality of memory elements of the cache line vector has a one-to-one correspondence with the plurality of cache memory lines; and
    a counter coupled to the cache line vector for counting how many of the plurality of memory elements in the cache line vector are storing activation data.

2. The system of claim 1, further including an error events logger that stores information about cache memory line errors that occurred in each of the plurality of cache memory lines.

3. The system of claim 1, further including a configurable threshold comparator coupled to the counter, wherein the configurable threshold comparator is triggered when the counter reaches a predetermined threshold.

4. The system of claim 3, further including a controller coupled to the configurable threshold comparator, the controller configured to determine correlations in the errors detected on the plurality of cache memory lines.

5. The system of claim 1, wherein the cache line vector includes a plurality of flip-flops that store the activation data.

6. A system, comprising:
    a cache memory including a plurality of cache lines;
    error detection logic coupled to the plurality of cache lines and configured to activate one or more outputs in association with an error in the plurality of cache lines;
    a cache line vector including a plurality of memory elements coupled to the one or more outputs of the error detection logic for storing error data generated by the error detection logic, the plurality of memory elements having a one-to-one correspondence with the plurality of cache lines; and
    a counter coupled to the cache line vector that counts a total number of the plurality of memory elements that are storing error data in the cache line vector.

7. The system of claim 6, further including analysis logic coupled to the cache line vector, the analysis logic producing a trigger signal in response to detected outputs from the cache line vector.

8. The system of claim 6, wherein the cache line vector includes a plurality of flip-flops coupled in parallel with the one or more outputs of the error detection logic.

9. The system of claim 6, further including an error events logger coupled to the one or more outputs of the error detection logic to capture which of the plurality of cache lines had an error.

10. The system of claim 9, wherein the error events logger associates a timestamp with each captured error.

11. The system of claim 6, further including a threshold comparator coupled to the counter for determining when the counter has exceeded a threshold value and for activating a trigger in response.

12. The system of claim 11, wherein the threshold comparator has a configuration input for modifying the threshold value.

13. The system of claim 6, further comprising a controller coupled to the cache line vector for correlating errors that occurred in the cache memory.

14. A method, comprising:
   capturing multiple activated signals of a cache-line error detection logic, wherein the capturing is performed in a cache-line vector having a different memory element associated with each cache line of a cache memory; and
   counting, via a counter coupled to the cache-line vector, a total number of the different memory elements in the cache-line vector that have captured one of the multiple activated signals.

15. The method of claim 14, further including activating a trigger signal when a threshold comparator coupled to the counter detects that the counter reached a predetermined value.

16. The method of claim 14, further including storing an event for each of the multiple activated signals, wherein the storing of the event includes storing an identifier of the cache line that failed and a time stamp of when it failed.

17. The method of claim 16, further including analyzing the events of the cache lines that failed for a correlation therebetween.

18. The method of claim 14, wherein each of the multiple activated signals occur when corresponding cache line errors occur.

19. The method of claim 14, wherein the memory elements are flip-flops with clock signal lines coupled to the cache-line error detection logic.

* * * * *